United States Patent
Selin (10) Patent No.: US 7,792,777 B2
(45) Date of Patent: Sep. 7, 2010

(54) METHOD, APPARATUS AND COMPUTER PROGRAM FOR REGISTERING A RESPECTIVE TARGET NETWORK SYSTEM STATE FROM EACH ONE OF A PLURALITY OF PROGRAMS

(75) Inventor: Jari Selin, Espoo (FI)

(73) Assignee: Nokia Corporation, Espoo (FI)

( * ) Notice: Subject to any disclaimer, the term of this patent is extended or adjusted under 35 U.S.C. 154(b) by 744 days.

(21) Appl. No.: 11/783,049

(22) Filed: Apr. 5, 2007

(65) Prior Publication Data

US 2008/0249974 A1    Oct. 9, 2008

(51) Int. Cl.
*G06F 17/00* (2006.01)
(52) U.S. Cl. ........................................ 706/48
(58) Field of Classification Search ................ 706/48
See application file for complete search history.

(56) References Cited

U.S. PATENT DOCUMENTS

| | | | | |
|---|---|---|---|---|
| 5,701,491 A | * | 12/1997 | Dunn et al. | 717/167 |
| H2201 H | * | 9/2007 | Stytz et al. | 717/104 |
| 2002/0083160 A1 | | 6/2002 | Middleton | |
| 2004/0039887 A1 | | 2/2004 | Gautney | |
| 2006/0142024 A1 | | 6/2006 | Thalanany et al. | |

FOREIGN PATENT DOCUMENTS

| | | |
|---|---|---|
| EP | 1 589 781 | 10/2005 |
| EP | 1 608 136 A1 | 12/2005 |
| EP | 1 768 021 A1 | 3/2007 |

OTHER PUBLICATIONS

Syntactic Phrase-Based Statistical Machine Translation, Hassan, H.; Hearne, M.; Way, A.; Simaan, K.; Spoken Language Technology Workshop, 2006. IEEE Digital Object Identifier: 10.1109/SLT.2006. 326799 Publication Year: 2006 , pp. 238-241.*

The Maximum Entropy based Rule Selection Model for Statistical Machine Translation (Invited Paper), Qun Liu; Zhongjun He; Universal Communication, 2008. ISUC '08. Second International Symposium on Digital Object Identifier: 10.1109/ISUC.2008.85 Publication Year: 2008 , pp. 89-96.*

Adaptive CSI Prediction in Linear Multi-User MIMO Systems, Mielczarek, B.; Krzymien, W.A.; Vehicular Technology Conference Fall (VTC 2009-Fall), 2009 IEEE $70^{th}$ Digital Object Identifier: 10.1109/VETECF.2009.5378981 Publication Year: 2009 , pp. 1-5.*

(Continued)

*Primary Examiner*—Michael Holmes
(74) *Attorney, Agent, or Firm*—Alston & Bird LLP (57) ABSTRACT

It is disclosed a method comprising registering a respective target network system state from each one of a plurality of programs, each of the plurality of programs comprising a first program state, detecting a current network system state, selecting one or more of the plurality of programs based on a result matching the detected current network system state against the registered target network system states, and commanding transition of the selected one or more programs from the first program state to a second program state different from the first program state.

29 Claims, 4 Drawing Sheets

OTHER PUBLICATIONS

Distribution Theory as the Basis of Generalized Passive-Network Analysis, Wohlers, M.; Beltrami, E.; Circuit Theory, IEEE Transactions on vol. 12 , Issue: 2 Publication Year: 1965 , pp. 164-170.*

International Search Report PCT/EP2008/052352 dated Sep. 4, 2008.

* cited by examiner

Fig. 2

Fig. 4

METHOD, APPARATUS AND COMPUTER PROGRAM FOR REGISTERING A RESPECTIVE TARGET NETWORK SYSTEM STATE FROM EACH ONE OF A PLURALITY OF PROGRAMS

FIELD OF THE INVENTION

The present invention relates to a method, apparatus and computer program for registering a respective target network system state from each one of a plurality of programs. In particular, the present invention is advantageously applicable in mobile stations, e.g. under consideration of the issues multi-radio, memory consumption reduction and power saving.

BACKGROUND

Communication technology has made considerable progress in recent time. With the ever advancing minimization of the physical size of mobile stations, memory space within such mobile stations remains limited, since ever more advanced memory technologies are proposed to offer substantially the same memory space on ever smaller physical space.

SUMMARY

Considering e.g. a podcasting application (i.e. an application for consuming media data, e.g. visual and/or audio data) on a personal computer or a mobile device, the application may be configured to detect the occurrence of connection of the device with e.g. a WLAN (Wireless Local Area network) network, and to start downloading a data content. However, in order to detect the connection to WLAN, the application must be running and in resident memory. Mobile devices tend to have so little memory, that loading multiple programs to memory in 'background' is not possible. For example, background applications may be closed when memory space becomes congested. If the application is forced to remain resident in memory, it might prevent some other application from running (e.g. web browser from displaying a large page).

Approaches have been suggested in which an application running e.g. on a mobile station that wishes to use a specific access technology (e.g. WLAN) remains resident in memory and checks for available access technologies e.g. regularly.

In consideration of the above, it is an object of the present invention to overcome one or more of the above drawbacks. In particular, the present invention provides method, apparatus and computer program for registering respective a target network system state.

According to the present invention, in a first aspect, this object is for example achieved by a method comprising:

registering a respective target network system state from each one of a plurality of programs, each of the plurality of programs comprising a first program state;

detecting a current network system state;

selecting one or more of the plurality of programs based on a result of matching the detected current network system state against the registered target network system states; and commanding transition of the selected one or more programs from the first program state to a second program state different from the first program state.

According to advantageous further refinements of the invention as defined under the above first aspect, the first program state is a non-resident state and the second program state is an active resident state;

the first program state is an active resident state and the second program state is a non-resident state;

the target network system state and the current network system state each comprise one or more of a network data rate, connection cost, an application type, an inactivity time interval, and an identification of a network technology;

the registering is performed upon installing the plurality of programs;

the registering is performed upon the plurality of programs polling the network;

the polling is performed periodically;

the registering, the detecting, the selecting and the commanding are performed by a respective portion of each of the plurality of programs comprising a third program state and conducting transition to the second program state;

the third program state is a non-active resident state of the respective portion of each of the plurality of programs;

the respective portion of each of the plurality of programs conducts transition from the third program state to the second program state periodically;

the respective portion of each of the plurality of programs conducts transition from the third program state to the second program state upon external request.

According to the present invention, in a second aspect, this object is for example achieved by an apparatus comprising:

a registrator configured to register a respective target network system state from each one of a plurality of programs, each of the plurality of programs comprising a first program state;

a detector configured to detect a current network system state;

a selector operably connected to both the registrator and the detector and configured to select one or more of the plurality of programs based on a result of matching the detected current network system state against the registered target network system states; and a commander operably connected to the selector and configured to command transition of the selected one or more programs from the first program state to a second program state different from the first program state.

According to advantageous further refinements of the invention as defined under the above second aspect, the first program state is a non-resident state and the second program state is an active resident state;

the first program state is an active state and the second program state is a non-resident state;

the apparatus according to the second aspect further comprises a non-volatile memory configured to store the plurality of programs in a non-resident state;

the apparatus according to the second aspect further comprises a volatile memory configured to store the plurality of programs in one of a non-active resident state and an active resident state;

the target network system state and the current network system state each comprise one or more of a network data rate, connection cost, an application type, an inactivity time interval, and an identification of a network technology;

the registrator is configured to register upon installing the plurality of programs;

the registrator is configured to register upon the plurality of programs polling the network;

the registrator is configured to register periodically;

the registrator, the detector, the selector and the commander are constituted by a respective portion of each of the plurality of programs comprising a third program state and conducting transition to the second program state;

the third program state is a non-active resident state of the respective portion of each of the plurality of programs;

the respective portion of each of the plurality of programs is configured to conduct transition from the third program state to the second program state periodically;

the respective portion of each of the plurality of programs is configured to conduct transition from the third program state to the second program state upon external request;

the apparatus according to the second aspect is chipset-insertable.

According to the present invention, in a third aspect, this object is for example achieved by an apparatus comprising:

means for registering a respective target network system state from each one of a plurality of programs, each of the plurality of programs comprising a first program state;

means for detecting a current network system state;

means operably connected to both the means for registering and the means for detecting and for selecting one or more of the plurality of programs based on a result of matching the detected current network system state against the registered target network system states; and means operably connected to the means for selecting and for commanding transition of the selected one or more programs from the first program state to a second program state different from the first program state.

According to the present invention, in a fourth aspect, this object is for example achieved by a computer program embodied on a computer-readable medium, configured to control a method comprising:

registering a respective target network system state from each one of a plurality of programs, each of the plurality of programs comprising a first program state;

detecting a current network system state;

selecting one or more of the plurality of programs based on a result matching the detected current network system state against the registered target network system states; and commanding transition of the selected one or more programs from the first program state to a second program state different from the first program state.

According to advantageous further refinements of the invention as defined under the above fourth aspect, the registering, the detecting, the selecting and the commanding are performed by a respective portion of the plurality of programs being in a third program state and conducting transition to the second program state;

the computer program is directly loadable into an internal memory of a mobile station entity.

In this connection, it has to be pointed out that advantageously the present invention enables one or more of the following:

The current network system state is detected, and the mobile station entity may manage the available network resources as required.

Each program or application may register its individual resource requirements so that the mobile station entity is capable of fulfilling differentiated program requirements.

Launching of several registered applications may be optimized so that the applications are launched e.g. sequentially. This behavior may cope with the issue that the programs or applications tend to follow their respective schedules before terminating. Furthermore, sequential initiation may reduce the risk of running out of memory. In addition, the entirety of applications may be prevented from polling the network for resource allocation upon elapse of the internal timer signals. Thus, the respective polling instances may no longer be random with regards to each other.

Launching a specific application may be effected in a 'timed' fashion, e.g. whenever connected to a suitable access technology. For example, if an email application is set to check for incoming email e.g. every 30 minutes when connected with WLAN access technology, the e-mail application may be launched appropriately.

The entire application activity may be synchronized to happen sequentially. All timed applications may be launched sequentially, thus minimizing the requirement for memory space.

There is provided considerable memory conservation and improvement of battery life, since applications prevented from running permanently in the memory require less energy than being resident in the memory.

There is provided saving on memory cost, since applications prevented from running in parallel may be less likely to saturate the available memory. Therefore, no larger memory has to be provided.

Hence, many applications in mobile stations work faster or cheaper or consume less power when using a specific access technology. In addition, memory in mobile stations is a scarce resource, and must therefore be conserved. Due to this reason, it is not practical to have such applications running in the mobile station permanently waiting for the suitable access to appear.

The present invention advantageously enables applications to register to a dispatching entity to wait for suitable radio access to appear. Once a suitable connection is available (e.g. WLAN), the dispatching entity may launch the application.

BRIEF DESCRIPTION OF THE DRAWINGS

Embodiments of the present invention are described herein below with reference to the accompanying drawings, in which.

DETAILED DESCRIPTION OF EMBODIMENTS OF THE PRESENT INVENTION

Embodiments of the present invention are described herein below by way of example with reference to the accompanying drawings.

First Embodiment

Herein below, a first embodiment of the present invention is described with reference to FIGS. 1 and 2.

Figure 1:
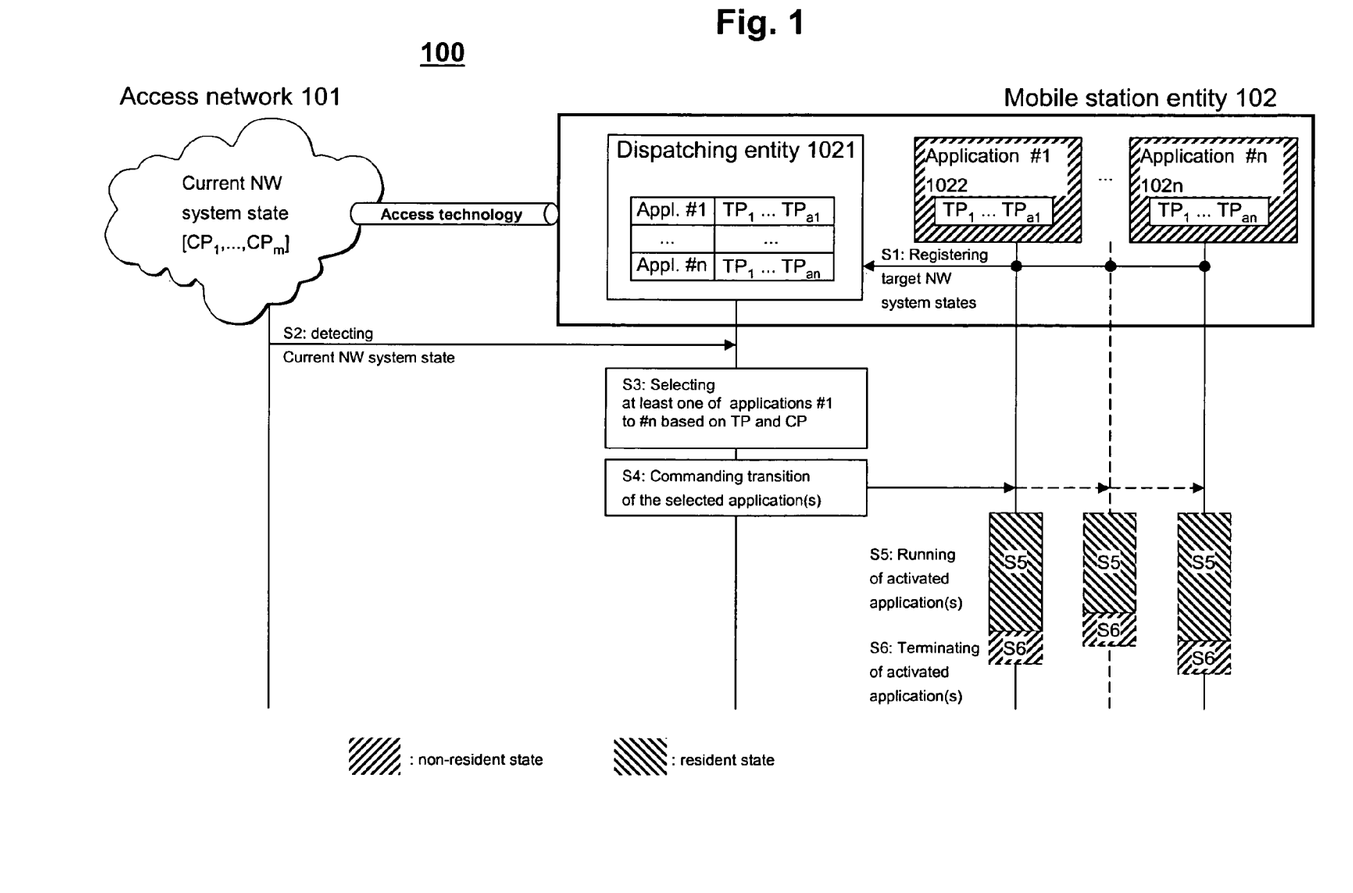
FIG. 1 shows a method for registering a respective current network system state according to a first embodiment of the present invention.

FIG. 1 shows a method for registering a respective current network system state according to the first embodiment of the present invention. Signalling between elements is indicated in horizontal direction, while time aspects between signalling are reflected in the vertical arrangement of the signalling sequence as well as in the sequence numbers.

As shown in FIG. 1, a communication network 100 comprises an access network 101. The access network 101 serves e.g. for providing access to various services and is defined e.g. by a current network system state CP. The current network system CP state may be expressed by a set of one or more current network system state parameters $CP_1, \ldots, CP_m$. These current network system state parameters may, among others, e.g. be network data rate, connection cost, an application type, an inactivity time interval and/or an identification of the at least one network technology.

Figure 2:
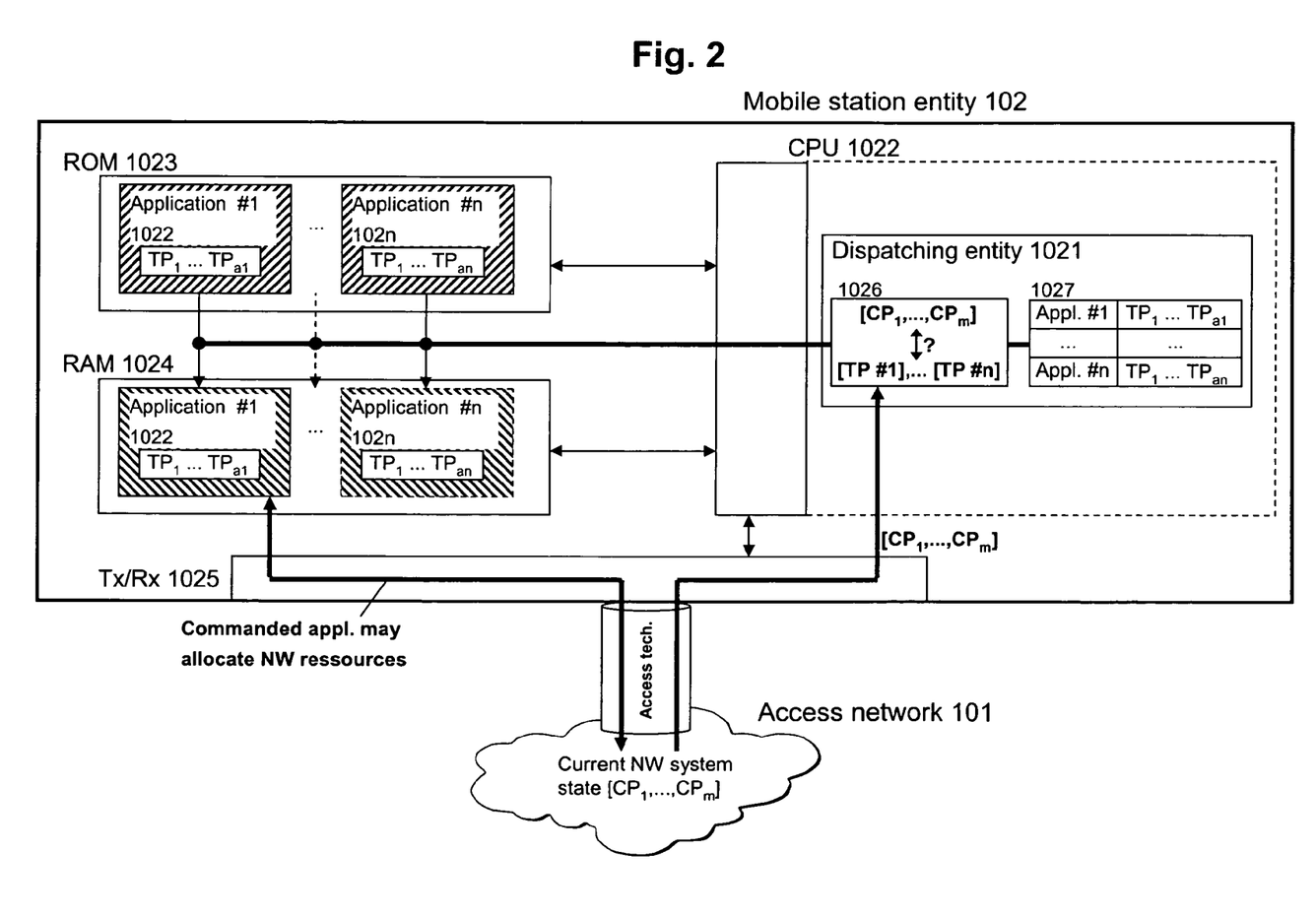
FIG. 2 shows an apparatus for registering respective a current network system state according to the first embodiment of the present invention.

The communication network 100 further comprises a mobile station entity 102 comprising a dispatching entity 1021 and one or more applications #1 to #n 1022 to 102n stored e.g. on a ROM (see FIG. 2). Each of the applications 1022 to 102n may comprise a target network system state $TP_1, \ldots, TP_n$ being e.g. a set of one or more target network system state parameters $TP_1 \ldots TP_{a1}, TP_1 \ldots TP_{an}$. These target network system state parameters may, among others, e.g. be network data rate, connection cost, an application type, an inactivity time interval, and/or an identification of the at least one network technology. The dispatching entity 1021 is described in detail herein below with reference to FIG. 2.

In step S1, each particular one of the applications 1022 to 102n may register the respective target network system state $TP_1, \ldots, TP_n$ at the dispatching entity 1021. The dispatching entity 1021 may be configured to store or hold the respective target network system states $TP_1, \ldots, TP_n$, as further described herein below with reference to FIG. 2. This registering may be performed e.g. upon installing the applications 1022 to 102n or upon the applications 1022 to 102n attempting to poll the access network 101. In this context, registering a target network state at the dispatching entity e.g. means associating, by and/or at the dispatching entity, the target network system state with the application.

Furthermore, in step S1, e.g. the dispatching entity 1021 or the applications 1022 to 102n themselves may be configured to perform transition of the applications 1022 to 102n e.g. into a non-resident state (i.e. the applications 1022 to 102n remain stored in the ROM, but not resident in a RAM (see FIG. 2)). As an example, this non-resident state is indicated in FIG. 1 by the applications 1022 to 102n being hatched in their functional blocks from bottom left to top right.

In step S2, the current network system state CP of the access network 101 is detected by the mobile station entity 102 and is supplied e.g. to the dispatching entity 1021.

In step S3, one (or more) of the applications 1022 to 102n are selected based on a result of matching the detected current network system state CP against the registered target network system states $TP_1, \ldots, TP_n$. This selecting may exhibit e.g. one of the following forms or combinations thereof:

(i) "best match": the parameters of target network system state(s) $TP_1, \ldots, TP_n$ of the application(s) having e.g. the smallest mean distance to the parameters of the current network system state may be selected;

(ii) "weighted match": the parameters of the current/target network system state may be multiplied by specific gain coefficients prior to conducting the "best match". As an example, the parameter 'network data rate' may be prioritized by a higher gain coefficient than that of the parameter 'connection cost';

(iii) "ordered match": the parameters of the current/target network system state may be matched in the order of parameters, and only in case of ambiguities or too many hits occurring in e.g. the first parameter, the second parameter is considered for matching, etc;

(iv) "technology ID": a parameter identifies the access technology that has been registered for the application(s) to use and such applications may be launched sequentially, for instance, based solely on this or in combination with other parameters;

(v) Examples of such rules can further comprise, for example, that all applications whose target network system states match, or sufficiently match, the current network system state are launched simultaneously, or that they are launched sequentially one after another such that a subsequent one is only launched after the previous one becomes non-resident in a RAM.

In step S4, the dispatching entity 1021 may command the activation of the one (or more) of the selected applications 1022 to 102n, i.e. the transition from e.g. the non-resident state into a resident state (i.e. the executable objects are produced from the applications 1022 to 102n stored in the ROM and are launched in a RAM (see FIG. 2)).

In step S5, the commanded one (or more) of the applications 1022 to 102n may perform their scheduled tasks since being e.g. in the resident state (indicated by the functional blocks of step S4 hatched from bottom right to top left).

In step S6, the commanded one (or more) of the applications 1022 to 102n may be terminated e.g. by performing transition from the resident state to the non-resident state (indicated by the functional blocks of step S5 hatched again from bottom left to top right). Alternatively, the dispatching entity 102 may be configured to stop or pause the commanded one (or more) application 1022 to 102n. In this case, stopping or pausing the commanded one (or more) application 1022 to 102n may be effected in co-operation with the application e.g. based on interrupting execution of the application or pausing the transmission effected by the application. The application 1022 to 102n in question may be configured to perform transition from the resident state to the non-resident state, and when performing transition from the non-resident state to the resident state subsequently, the application 1022 to 102n in question may be configured to resume execution e.g. based on information on a preceding execution.

FIG. 2 shows an apparatus, e.g. a mobile station entity 102, for registering a respective current network system state according to the first embodiment of the present invention.

As shown in FIG. 2, the mobile station entity 102 comprises the dispatching entity 1021, a CPU 1022 for processing various signals, a ROM 1023, a random-access memory (RAM) 1024 and a transceiver (Tx/Rx) and network measurement device or tool 1025 (Tx/Rx measurement entity hereinafter). It is to be noted that the functionalities of the Tx/Rx measurement entity 1025, i.e. sending and/or receiving e.g. via an access technology and measurement of the current network system state may be comprised in one entity 1025 (as shown in FIG. 2) or in entities distributed e.g. in the mobile station entity 102.

Furthermore, the dispatching entity 102 may comprise or have access to a selector 1026 and a registrator 1027. The selector 1026 and the registrator 1027 may also be implemented as software code portions e.g. of the dispatching entity 1021 and/or the CPU 1022, or as an operating system running e.g. on the CPU 1022, and may exhibit one or more of the following functionality/functionalities:

the registrator 1027 may be configured e.g. in conjunction with the CPU 1022 and the ROM 1023 and/or the RAM

1024 to register a respective target network system state $TP_1, \ldots, TP_n$ from each one of a plurality of applications 1022 to 102n;

the Tx/Rx measurement entity 1025 e.g. in conjunction with the CPU 1022 may be configured to detect a current network system state CP;

the selector 1026 may be operably connected to both the registrator 1027 and the Tx/Rx measurement entity 1025 and may be configured to select one or more of the plurality of the applications 1022 to 102n based on a result of matching (indicated by the double arrow having an adjacent question mark) the detected current network system state CP against the registered target network system states $TP_1, \ldots, TP_n$;

depending e.g. on the implementation of the dispatching entity 1021 described herein below, the dispatching entity 1021 and/or the CPU 1022 may comprise and/or be operably connected to the selector 1026, and may be configured to command transition of the selected one or more applications 1022 to 102n from the first program state (e.g. non-resident state/active resident state) to a second program state (e.g. active resident state/non-resident state) different from the first program state. The dispatching entity may comprise, or consist of, a commander configured to command transition of programs from resident to non-resident states, or non-resident to resident states.

It is to be noted that the dispatching entity 1021 may be implemented, among others, e.g. in the following forms or any combinations thereof:

(i): on-chip hardware implementation e.g. integrally with the CPU 1022, ROM 1023 and/or RAM 1024 (indicated by a broken line extension of the functional block of the CPU 1022);

(ii): hardware implementation e.g. as a chipset-insertable device on an own chip to be inserted into the mobile station entity 102;

(iii): firmware implementation e.g. as an instruction set extension of the CPU 1022;

(iv): software implementation e.g. as source code in the ROM 1023 and as a related executable object in the RAM 1024.

Referring back to FIG. 1, the applications #1 to #n 1022 to 102n may be stored or held e.g. in the ROM 1023 in a non-resident state (indicated by being hatched from bottom left to top right). Alternatively, the applications 1022 to 102n may also be stored or hold in another ROM e.g. in the access network 101 to which ROM the mobile station entity 102 may have access. In this case, the mobile station entity 102 may not require comprising the ROM 1023.

As described in conjunction with step S1 of FIG. 1, the applications 1022 to 102n may be configured to register their respective target network system states $TP_1, \ldots, TP_n$ in the dispatching entity 1021 e.g. by the registrator 1027. Depending on the above-described implementation form, the dispatching entity 1021 may be configured to store or hold the registered target network system states $TP_1, \ldots, TP_n$ in a one-to-one correspondence with the respective applications 1022 to 102n e.g. in the ROM 1023, the RAM 1024, a cache (not shown) of the CPU 1022, or the registrator 1027 itself.

As described in conjunction with step S2 of FIG. 1, the current network system state CP: $[CP_1, \ldots, CP_m]$ in the access network 101 may be detected e.g. via the Tx/Rx measurement entity 1025. Alternatively, the access network 101 may also be configured to transmit or broadcast the current network system state CP, in which case the Tx/Rx measurement entity 1025 may not require comprising the measurement functionality, and it may be sufficient to receive the current network system state from the network.

As described in conjunction with step S3 of FIG. 1, the current network system state CP in the access network 101 may be matched against the registered target network system states $TP_1, \ldots, TP_n$. Furthermore, as mentioned above, the dispatching entity 1021 may be configured to store or hold pre-determined rules e.g. in the selector 1026 on how to select one (or more) of the applications 1022 to 102n based on the result of matching the current network system state CP against the target network system states $TP_1, \ldots, TP_n$.

As described in conjunction with step S4 of FIG. 1, the dispatching entity 102 may be configured to command transition of the selected one (or more) of the applications 1022 to 102n e.g. from the non-resident state (being stored in the ROM 1023) to the resident state (being held in the RAM 1024, indicated by being hatched from bottom right to top left).

In a particular example, to which the present invention is not to be restricted to, the target network system states of two exemplary applications #1 and #2 may have the following form:

appl.#1: $TP_1$: Network data rate $\geq 1$ Mb/s
  $TP_2$: Cost=0
  $TP_3$: Application type=podcast
appl.#2: $TP_1$: Network data rate =>2 Mb/s
  $TP_2$: Cost$\leq$5 c/s
  $TP_3$: Application type=podcast In other words, application #1 is configured to use e.g. an access having a data rate of 1 Mb/s or more, but inflicting no additional cost (e.g. flat-rate) or being free of charge. Application #2 is configured to use e.g. an access having a data rate of 2 Mb/s or more, but inflicting costs up to 5 cent/s. Both applications have the application type podcast.

The detected current network system state CP may have the following form:
  $CP_1$: Network data rate ~2.5 Mb/s
  $CP_2$: Cost=2.5 c/s
  $CP_3$: Application type=podcast With this configuration, the dispatching entity 102 would select application #2 and command transition of application #2 in the resident state, since both applications #1 and #2 would accept the network data rate, but only application #2 accepts the (additional) costs.

As described in conjunction with steps S5 and S6 of FIG. 1, the commanded application (as an example, application #1 is chosen) may have access to the access network 101 e.g. via the Tx/Rx measurement entity 1025 and e.g. the WLAN access technology, and may terminate processing (i.e. transition from the resident state to the non-resident state) upon completion of the task of the commanded application or upon interrupt e.g. from the dispatching entity 1021.

Second Embodiment

Herein below, a second embodiment of the present invention is described with reference to FIGS. 3 and 4. For brevity of description, only the differences to the first embodiment in conjunction with FIGS. 1 and 2 are described.

Figure 3:
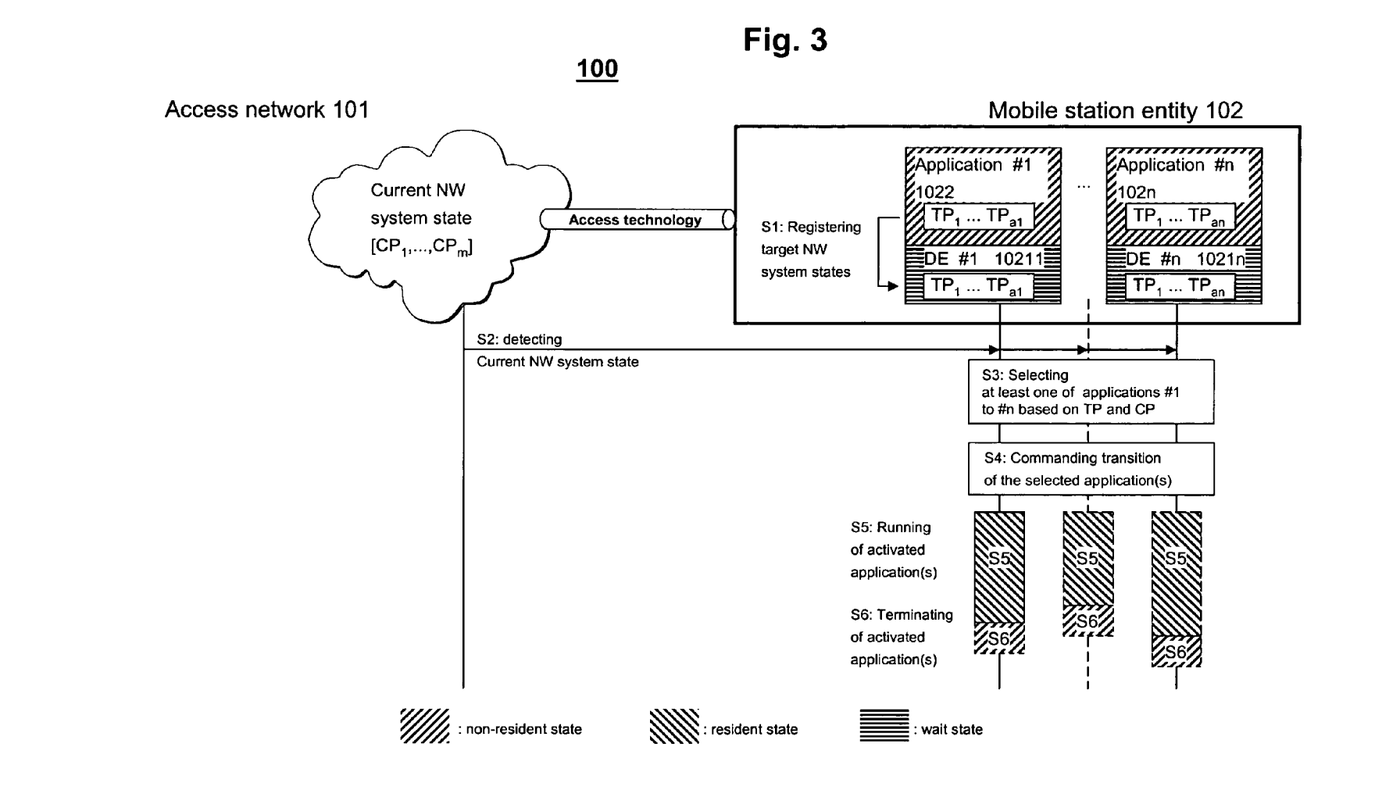
FIG. 3 shows a method for registering a respective current network system state according to a second embodiment of the present invention.

FIG. 3 shows a method for registering a current network system state according to the second embodiment of the present invention. Again, signalling between elements is indicated in horizontal direction, while time aspects between signalling are reflected in the vertical arrangement of the signalling sequence as well as in the sequence numbers.

Referring back to FIG. 1, the same reference signs designate the same or similar components in FIG. 3. For the sake of description brevity, description of the components being unchanged as compared to FIG. 1 (i.e. communication network 100, access network 101, mobile station entity 102, and applications #1 to #n 1022 to 102n as well as access technology) is omitted.

As for the differences, the dispatching entity 1021 according to the first embodiment may be distributed according to the second embodiment, so that each of the applications 1022 to 102n comprises an individual application portion constituting an individual dispatching entity DE #1 10211 to DE #n 1021n. These individual dispatching entities 10211 to 1021n may e.g. be application portions or independent programs in a wait state (indicated by being hatched from left to right), i.e. the portion or independent program is in a non-active resident state, while (the remainder of each of) the applications 1022 to 102n remain e.g. in the non-resident state.

Therefore, in step S1 of FIG. 3, each particular one of the applications 1022 to 102n may be configured to register the respective target network system state $TP_1, \ldots, TP_n$ at the individual dispatching entity 10211 to 1021n e.g. by the registrator 1027. The dispatching entities 10211 to 1021n may be configured to store or hold the respective target network system state $TP_1, \ldots, TP_n$, as further described herein below with reference to FIG. 4. This registering may be performed e.g. upon installing the applications 1022 to 102n or upon the applications 1022 to 102n attempting to poll the access network 101.

Step S2 of FIG. 3 may be substantially identical with step S2 of FIG. 1, wherein the current network system state CP is supplied e.g. to all individual dispatching entities 10211 to 1021n.

Steps S3 and S4 of FIG. 3 may be substantially identical with steps S3 and S4 of FIG. 1. However, the individual dispatching entities 10211 to 1021n may additionally be configured e.g. to be prioritized with respect to each other.

Steps S5 and S6 of FIG. 3 may be identical with steps S5 and S6 of FIG. 1.

Figure 4:
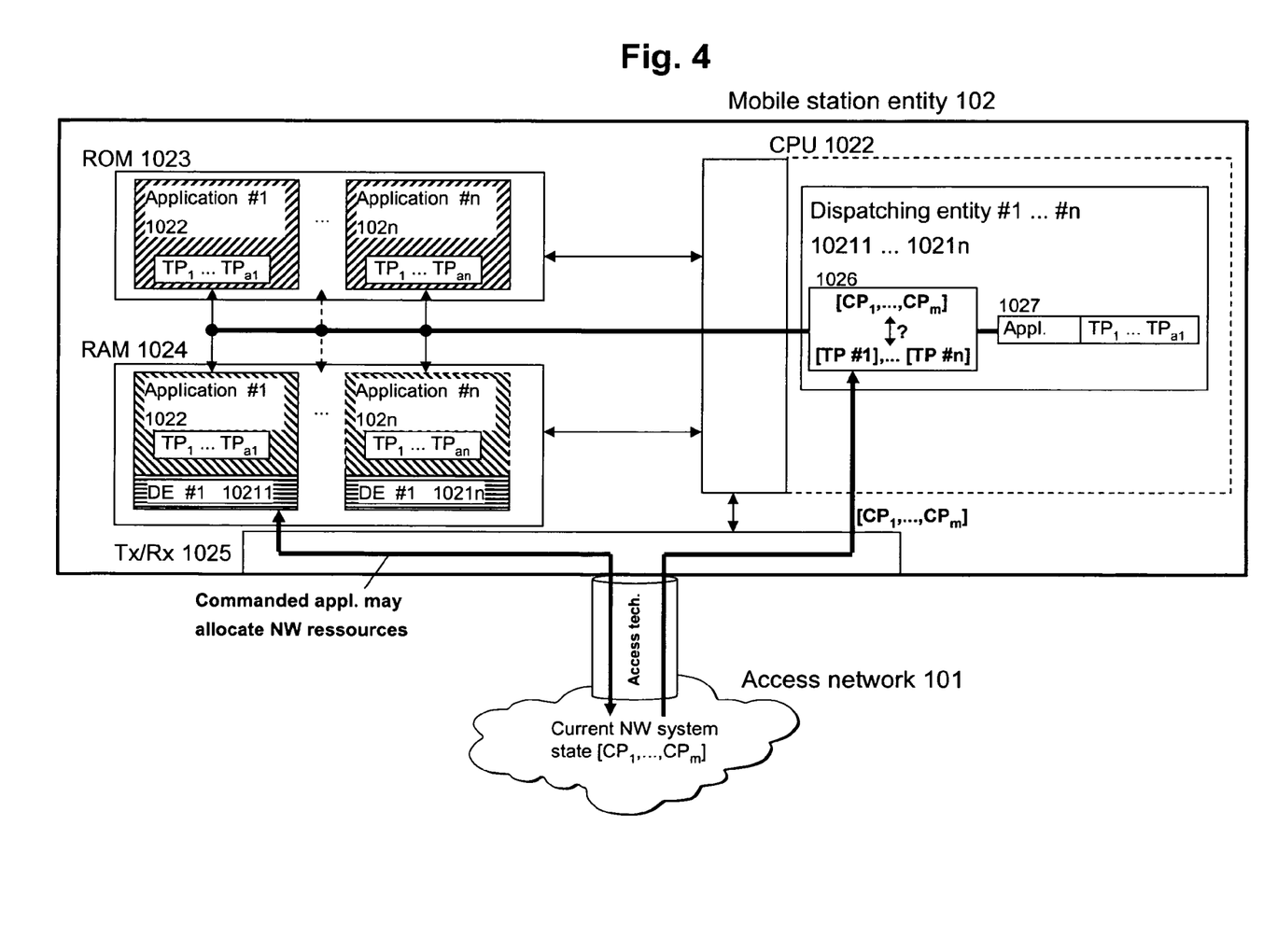
FIG. 4 shows an apparatus for registering a respective current network system state according to the second embodiment of the present invention.

FIG. 4 shows an apparatus, e.g. a mobile station entity 102, for registering a current network system state according to the second embodiment of the present invention.

Referring back to FIG. 2, the same reference signs designate the same or similar components in FIG. 4. For the sake of description brevity, description of the components being unchanged as compared to FIG. 2 (i.e. access network 101, mobile station entity 102, CPU 1022, ROM 1023, RAM 1024, Tx/Rx measurement entity 1025, selector 1026, registrator 1027, and applications #1 to #n 1022 to 102n as well as access technology) is omitted.

As for the differences, as described with reference to FIG. 2, the dispatching entity 1021 according to the first embodiment may be distributed in the second embodiment, so that each of the applications 1022 to 102n comprises an individual application portion constituting an individual dispatching entity DE #1 10211 to DE #n 1021n. Alternatively, the individual dispatching entities DE #1 10211 to DE #n 1021n may be constituted by independent programs respectively associated with the applications 1021 to 102n. These individual dispatching entities 10211 to 1021n may e.g. be the application portions or the independent programs in a wait state (indicated by being hatched from left to right), i.e. the portion or the independent program is in a non-active resident state, while (the remainder of each of) the applications 1022 to 102n remains e.g. in the non-resident state.

It is to be noted that the dispatching entities 10211 to 102n may be implemented, among others, e.g. in the following forms or a combination thereof:

(i): software implementation e.g. as portions of the source code of the associated application in the ROM 1023 and as related executable objects in the RAM 1024;

(ii): software implementation e.g. as independent source codes (not shown) being associated respectively with the applications in the ROM 1023 and as related executable objects in the RAM 1024.

Referring back to FIG. 2, the (remainder of the) applications #1 to #n 1022 to 102n may be stored or held e.g. in the ROM 1023 in a non-resident state (indicated by being hatched from bottom left to top right).

As described in conjunction with step S1 of FIG. 3, the applications 1022 to 102n may be configured to register the respective target network system state $TP_1, \ldots, TP_n$ in the respective individual dispatching entity 10211 to 102n e.g. by the respective registrator 1027.

As described in conjunction with step S3 of FIG. 3, each of the individual dispatching entities 10211 to 1021n may be configured to have access to pre-determined rules e.g. in a common or respective selector 1026 on how to select the associated (remainder of the) application 1022 to 102n.

As described in conjunction with step S4 of FIG. 3, the dispatching entities 10211 to 1021n may be configured to command transition of the associated selected (remainder of) application 1022 to 102n e.g. from the non-resident state (being stored in the ROM 1023) to the resident state (being held in the RAM 1024, indicated by being hatched from bottom right to top left). In addition, as mentioned above according to the second embodiment, the dispatching entities 10211 to 1021n may e.g. be prioritized with respect to each other.

Due to the above, the particular example given in the first embodiment may function in substantially the same way when effected in the second embodiment.

The second embodiment may be summarized as follows, without being restricted to the implementation details: a similar kind of effect as obtained in the first embodiment may be accomplished by launching first a smaller monitor portion of each application that assumes a non-active resident state and performs transition to the active resident state e.g. periodically. If a connectivity (e.g. in WLAN) becomes available, then the remainder of the actual application is launched e.g. as additional thread, i.e. performs transition the resident state. So instead of a centralized dispatcher, this can be done using an application specific dispatcher/monitor. The application specific monitor may take the form of a portion of an application or the form of a standalone program, and it may enter a wait state and emerge therefrom periodically, or it may receive e.g. interrupts from the multi-access transceiver when attachment to an access is completed. The dispatcher(s) may be triggered by an interrupt when the current network state parameters change.

Without being restricted to the following implementation details, the present invention may be summarized according to the following: It is proposed that a so-called 'registrator' is configured to register applications with specific kinds of accesses, and these associations between applications and specific kinds of accesses may be stored in a 'dispatching entity'. As soon as the access becomes available, the dispatching entity may launch the application in question. When the application is installed or set to periodically poll the network, the application in question may register itself to the dispatching entity. The parameters that are specified in the associations can e.g. be like the following:

Network data rate =>1 Mb
Cost=0
Application type=podcast

The above example illustrates a case where the application may want to use broadband connection such as WLAN or WIMAX, but only if such connection does not involve additional cost (i.e. flat-rate) or is free of charge. In a simplest case, a user might only define that the application is launched when device connects to a specific WLAN access point identified e.g. by the network data rate. Also the technology type may be identified, such that e.g. the application is triggered every time the device attached to a WIMAX access.

The present invention is e.g. applicable to mobile devices which are resource constrained. The invention is also applicable if implemented e.g. as a public API (Application Programming Interface) for $3^{rd}$ party developers, or if implemented e.g. as closed function within a system.

Other Embodiments

For the purpose of the present invention as described herein above, it should be noted that

- an access technology may be any technology by means of which a mobile station can access a communication network. Although certain access technologies are used as exemplary access technologies for descriptive purposes herein above, other present or future technologies, such as WLAN, WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies;
- an access network may be any device, unit or means by which a mobile station entity or other user equipment may connect to and/or utilize services offered by the access network; such services include, among others, data and/or (audio-) visual communication, data download etc.;
- generally, the present invention is also applicable in those network/terminal environments relying on a data packet based transmission scheme according to which data are transmitted in data packets and which are for example based on the Internet Protocol IP. The present invention is, however, not limited thereto, and any other present or future IP or mobile IP (MIP) version, or, more generally, a protocol following similar principles as (M)IPv4/6, is also applicable;
- an access entity as a part of the access network element may for example be any device, unit or means by which a user can access to a communication network based on an access technology;
- a mobile station entity may be any device, unit or means by which a system user may experience services from an access network; alternatively, the mobile station may also be a mobile base station having limited memory space in which the principles of the invention as described herein above may be applied; Further, as an example of the mobile station, a mobile terminal (e.g. a cell phone) is used for descriptive purposes herein above. However, this does not exclude that the principles of the invention are also applicable at a fixed (base) station having limited memory space and using e.g. directional radio communication;
- a random-access memory (RAM hereinafter) may be any device, unit or means by which information is stored or hold in a volatile fashion; As an example, a chip RAM is used herein above for descriptive purposes, but this does not exclude that the RAM as a volatile memory may also be constituted e.g. by a cache (on-chip architecture), a(n) (ultra) short-term memory (neuronal architecture), or a swap file (computer architecture in case normal volatile memory runs low);
- a read-only memory (ROM hereinafter) may be any device, unit or means by which information is stored or hold in a non-volatile fashion; As an example, a chip ROM is used herein above for descriptive purposes, but this does not exclude that the ROM as a non-volatile memory may also be constituted e.g. by an optical/magnetic disk, a long-term memory (neuronal architecture), or an EEPROM (electrically erasable and programmable ROM);
- a program may be any source code e.g. stored in a ROM and related executable object e.g. held in a RAM; although herein above only applications (i.e. application programs) are used for descriptive purposes, this does not exclude that these programs may be applications running e.g. on layer 7 defined by the OSI (Open Systems Interconnection) model as well as programs running on other layers defined by the OSI model;
- method steps likely to be implemented as software code portions and being run using a processor at the network element, are software code independent and can be specified using any known or future developed programming language as long as the functionality defined by the method steps is preserved;
- generally, any method step is suitable to be implemented as software or by hardware without changing the idea of the present invention in terms of the functionality implemented;
- method steps and/or devices, units or means likely to be implemented as hardware components at a mobile station or network element or module thereof are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. mobile station entity) can be implemented as individual devices, units or means, but this does not exclude that they are implemented in a distributed fashion throughout the system, as long as the functionality of the device, unit or means is preserved.

The invention claimed is:

1. A method, comprising:
registering a respective target network system state from each one of a plurality of programs, each of the plurality of programs comprising a first program state;
detecting a current network system state;
selecting one or more of the plurality of programs based on a result of matching the detected current network system state against the registered target network system states; and
commanding transition of the selected one or more programs from the first program state to a second program state different from the first program state, wherein the target network system state and the current network system state each comprise one or more of a network data rate, connection cost, an application type, an inactivity time interval, or an identification of a network technology.

2. The method according to claim 1, wherein the first program state comprises a non-resident state and the second program state comprises an active resident state.

3. The method according to claim 1, wherein the first program state comprises an active resident state and the second program state comprises a non-resident state.

4. The method according to claim 1, wherein the registering is performed in response to installation of the plurality of programs.

5. The method according to claim 1, wherein the registering is performed in response to the plurality of programs polling the network.

6. The method according to claim 5, wherein the polling is performed periodically.

7. The method according to claim 1, wherein the registering, the detecting, the selecting and the commanding are performed by a respective portion of each of the plurality of programs comprising a third program state and conducting transition to the second program state.

8. The method according to claim 7, wherein the third program state comprises a non-active resident state of the respective portion of each of the plurality of programs.

9. The method according to claim 7, wherein the respective portion of each of the plurality of programs is configured to conduct transition from the third program state to the second program state periodically.

10. The method according to claim 7, wherein the respective portion of each of the plurality of programs is configured to conduct transition from the third program state to the second program state in response to external request.

11. An apparatus comprising at least one processor and at least one memory storing computer program code, wherein the at least one memory and stored computer program code are configured, with the at least one processor, to cause the apparatus to at least:
register a respective target network system state from each one of a plurality of programs, each of the plurality of programs comprising a first program state;
detect a current network system state;
select one or more of the plurality of programs based on a result of matching the detected current network system state against the registered target network system states; and
command transition of the selected one or more programs from the first program state to a second program state different from the first program state,
wherein the target network system state and the current network system state each comprise one or more of a network data rate, connection cost, an application type, an inactivity time interval, or an identification of a network technology.

12. The apparatus according to claim 11, wherein the first program state comprises a non-resident state and the second program state is an active resident state.

13. The apparatus according to claim 11, wherein the first program state comprises an active state and the second program state comprises a non-resident state.

14. The apparatus according to claim 11, further comprising:
a non-volatile memory configured to store the plurality of programs in a non-resident state.

15. The apparatus according to claim 11, further comprising:
a volatile memory configured to store the plurality of programs in one of a non-active resident state and an active resident state.

16. The apparatus according to claim 11, wherein the at least one memory and stored computer program code are configured, with the at least one processor, to cause the apparatus to register the respective target network system state from each one of the plurality of programs in response to installation of the plurality of programs.

17. The apparatus according to claim 11, wherein the at least one memory and stored computer program code are configured, with the at least one processor, to cause the apparatus to register the respective target network system state from each one of the plurality of programs in response to the plurality of programs polling the network.

18. The apparatus according to claim 17, wherein the at least one memory and stored computer program code are configured, with the at least one processor, to cause the apparatus to register the respective target network system state from each one of the plurality of programs periodically.

19. The apparatus according to claim 11, wherein the stored computer program code is constituted at least in part by a respective portion of each of the plurality of programs comprising a third program state and conducting transition to the second program state.

20. The apparatus according to claim 19, wherein the third program state comprises a non-active resident state of the respective portion of each of the plurality of programs.

21. The apparatus according to claim 19, wherein the respective portion of each of the plurality of programs is configured to conduct transition from the third program state to the second program state periodically.

22. The apparatus according to claim 19, wherein the respective portion of each of the plurality of programs is configured to conduct transition from the third program state to the second program state in response to an external request.

23. The apparatus according to claim 11, wherein the apparatus is chipset-insertable.

24. An apparatus, comprising:
means for registering a respective target network system state from each one of a plurality of programs, each of the plurality of programs comprising a first program state;
means for detecting a current network system state;
means operably connected to both the means for registering and the means for detecting and for selecting one or more of the plurality of programs based on a result of matching the detected current network system state against the registered target network system states; and
means operably connected to the means for selecting and for commanding transition of the selected one or more programs from the first program state to a second program state different from the first program state
wherein the target network system state and the current network system state each comprise one or more of a network data rate, connection cost, an application type, an inactivity time interval, or an identification of a network technology.

25. A computer program product comprising at least one tangible computer-readable medium having computer-readable program instructions stored therein, the computer-readable program instructions comprising:

program instructions configured to register a respective target network system state from each one of a plurality of programs, each of the plurality of programs comprising a first program state;
program instructions configured to detect a current network system state;
program instructions configured to select one or more of the plurality of programs based on a result matching the detected current network system state against the registered target network system states; and
program instructions configured to command transition of the selected one or more programs from the first program state to a second program state different from the first program state,
wherein the target network system state and the current network system state each comprise one or more of a network data rate, connection cost, an application type, an inactivity time interval, or an identification of a network technology.

26. The computer program product according to claim 25, wherein the program instructions configured to register, detect, select and command are comprised at least in part by a respective portion of the plurality of programs being in a third program state and conducting transition to the second program state.

27. The computer program product according to claim 25, wherein the at least one tangible computer-readable medium comprises an internal memory of a mobile station entity.

28. The method according to claim 1, wherein selecting one or more of the plurality of programs comprises using a processor to select one or more of the plurality of programs.

29. The apparatus according to claim 11, wherein the apparatus comprises or is embodied on a mobile phone.

* * * * *